Dec. 18, 1956          D. L. SPANJER          2,774,638
ECCENTRIC TRACK ADJUSTMENT
Filed June 28, 1954

INVENTOR
DAVID LUCIEN SPANJER

BY Harold T. Stowell

ATTORNEY

United States Patent Office 2,774,638
Patented Dec. 18, 1956

2,774,638
ECCENTRIC TRACK ADJUSTMENT
David Lucien Spanjer, Leeds, England, assignor to The Eimco Corporation, Salt Lake City, Utah, a corporation of Utah Application June 28, 1954, Serial No. 439,773
Claims priority, application Great Britain June 26, 1953
3 Claims. (Cl. 305—9)

This invention relates to an endless track assemblage including an endless track extending between a driving sprocket and a main idler wheel disposed between side plates of a track-carrying structure, and the invention is particularly concerned with improvements in track-tensioning means for such an assemblage.

The invention has for its object to provide an improved simple and effective construction of tensioning means associated with a main idler wheel or idler sprocket (hereinafter termed "wheel"), whereby adjustment of track tension may be facilitated.

According to the present invention, there is provided, in an endless track assemblage of the kind referred to, track-tensioning means comprising a mounting for the main idler wheel adjustable about an axis eccentric to the axis of the wheel, and means for effecting angular adjustment of said mounting about said axis.

More specifically, the invention includes endless track-tensioning means comprising a cylindrical mounting member on which the main idler wheel is rotatable, a pair of spindles extending through said mounting member parallel to the axis thereof, said spindles being spaced apart one on each side of the axis of the mounting member, one of said spindles being located in bearing means in the side plates of the assemblage, tie means at each end of the spindles connecting said spindles in rigid relationship, and an operating member associated with one tie means for effecting angular adjustment about the axis of the spindle located in said bearing means and to cause arcuate movement of the other spindle for effecting angular adjustment of said mounting member. The operating member may comprise an arm provided with means selectively engageable with an arcuate series of holes in the respective side plate of the assemblage.

Figure 1:
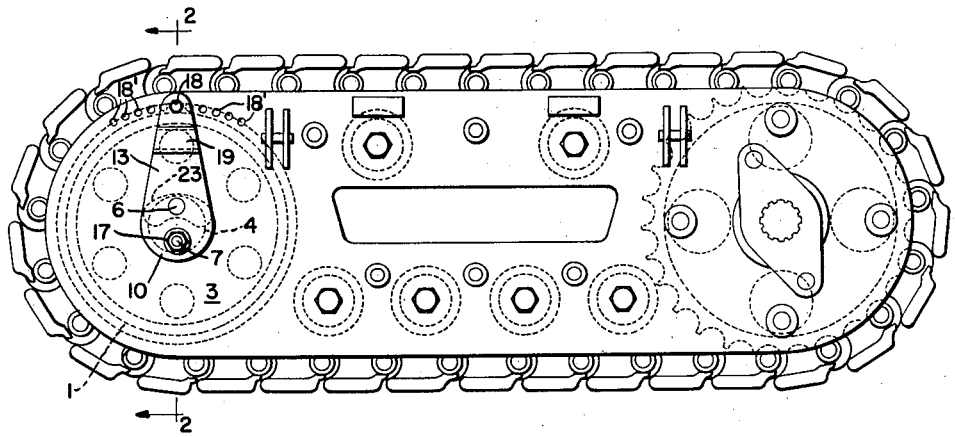
Figure 2:
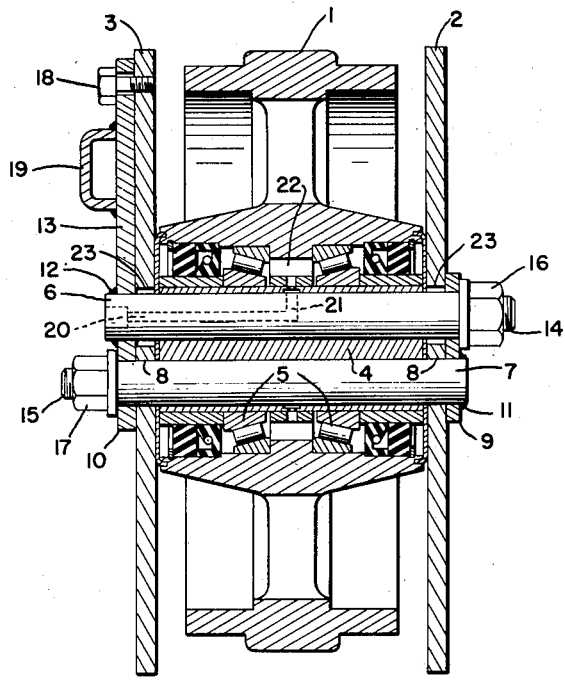

The invention will be further described with reference to the illustrated embodiments shown in the accompanying drawings in which:

Fig. 1 is a side elevation illustrating an endless track assemblage including the endless track take-up mechanisms of the invention; and Fig. 2 is a section substantially on line 2—2 of Fig. 1.

In carrying the invention into effect according to one embodiment, and with reference to the accompanying diagrammatic drawing, a main idler wheel 1 of an endless track assemblage is carried between side plates 2, 3 of a track-supporting structure on a cylindrical mounting member 4 through the intermediary of bearings 5, whereby the wheel 1 is rotatable on the mounting member 4. A pair of spindles or bolts 6, 7 extend through the mounting member 4 parallel to the axis thereof, the spindles or bolts 6, 7 being spaced one on each side of the axis of the mounting member 4. One spindle or bolt 7 is located in bearing means, such as holes 8, in the side plates 2, 3, while the other spindle or bolt 6 is located in rigid relationship with the spindle or bolt 7 by tie means 9 and 10 associated with the ends of the spindles or bolts 6, 7. Conveniently, the spindle or bolt 7 is welded at 11 to the tie means 9 in the form of a plate, while the opposite end of the spindle or bolt 6 is welded at 12 to the tie means 10 which embodies an arm 13 extending at the outside of the side plate 3. Screw-threaded end portions 14, 15 of the respective spindles or bolts 6, 7 cooperate with nuts 16, 17 respectively for holding the parts in position. The arm 13 nearer its outer end is provided with means, such as a bolt 18, selectively engageable with an arcuate series of holes 18' in the respective side plate 3, and said arm 13 also may be provided with means, such as a channel member 19 welded thereto and forming a socket for the insertion of a suitable tool for effecting movement of the arm 13. The spindle or bolt 6 may have a lubricant passage 20 communicating with a radial passage 21 for the supply of lubricant to a chamber 22 between the bearings 5. The spindle or bolt 6 extends through arcuate slots 23 in the side plates 2, 3.

In operation the bolt 18 securing the arm 13 is unscrewed and the arm is then swung about the axis of the spindle or bolt 6, whereby the spindle 7 will move in an arcuate path and in so doing will cause eccentric displacement of the mounting member 4 for adjusting the tension of an endless track 25 engaging the idler wheel 1.

The bearings 5 may be sealed by conventional oil sealing means as shown.

It will be understood that the invention is not limited to the particular embodiment hereinbefore described. For example, any other suitable construction of the eccentric mounting for the idler wheel may be employed for effecting adjustment of the endless track.

What I claim is:

1. Endless track-tensioning means for an endless track unit having a track frame, a main idler wheel carried at one end of the track frame, a drive sprocket carried at the other end of the track frame, and an endless track extending therebetween comprising a cylindrical mounting member on which the main idler wheel is rotatable, a pair of spindles extending through said mounting member parallel to the axis thereof, said spindles being spaced apart one on each side of the axis of the mounting member, bearing means mounting one of said spindles in the track frame, tie means at each end of the spindles connecting said spindles in rigid relationship, and an operating member secured to one tie means for effecting angular adjustment about the axis of the spindle located in said bearing means and to cause arcuate movement of the other spindle for effecting angular adjustment of said mounting member.

2. Track-tensioning means according to claim 1 wherein the operating member comprises an arm provided with means selectively engageable with an arcuate series of holes provided in the sides of the track frame.

3. In an endless track unit for vehicles having a track frame, a main idler wheel carried at one end of the track frame, a drive sprocket carried at the other end of the track frame, and an endless track extending therebetween; means for tensioning the endless track comprising a cylindrical mounting member on which the main idler wheel is rotatably mounted, a pair of spindles extending through said mounting member parallel to the axis thereof with one spindle on each side of the pivotal axis of the cylindrical mounting member, means mounting one of the spindles in the track frame, tie means at each end of the spindles connecting said spindles in rigid relationship, and an operating member secured at right angles to one of the tie means for effecting angular adjustment about the axis of the said one spindle to cause accurate movement of the other of said spindles for effecting angular adjustment of said cylindrical mounting member.

References Cited in the file of this patent

UNITED STATES PATENTS

| | | |
|---|---|---|
| 1,926,244 | Sargent | Sept. 12, 1933 |
| 2,466,029 | Knox et al. | Apr. 5, 1949 |